June 4, 1968 J. L. FISCHER ET AL 3,387,098

TELEPHONE REPERTORY DIALER

Filed Dec. 28, 1964 4 Sheets-Sheet 1

INVENTORS J. L. FISCHER
L. A. STROMMEN
BY E J Olinder
ATTORNEY

TELEPHONE REPERTORY DIALER

TELEPHONE REPERTORY DIALER

TELEPHONE REPERTORY DIALER

United States Patent Office 3,387,098

Patented June 4, 1968

3,387,098

TELEPHONE REPERTORY DIALER

James L. Fischer, Carmel, and Lawrence A. Strommen, Indianapolis, Ind., assignors to Bell Telephone Laboratories, Incorporated, New York, N.Y., a corporation of New York Filed Dec. 28, 1964, Ser. No. 421,456
12 Claims. (Cl. 179—90)

ABSTRACT OF THE DISCLOSURE

In a telephone repertory dialer, operation in the RECORD mode is effected by translating conventional dial generated signals into binary code form and then employing only a single recording head for sequentially recording all of the binary elements corresponding to each dialed digit longitudinally on a recording medium.

This invention relates to telephone repertory dialers and more particularly to repertory dialers of the Touch-Tone® or multifrequency signaling type.

Repertory dialers are automatic telephone call transmitters which enable subscribers to initiate calls by exercising only a minimum of mechanical manipulation, for example, depressing a signal key, as opposed to dialing manually each digit of the called party's directory number. Basically, such apparatus comprises a register which initially stores signal indicia of a group of directory numbers and subsequently, when a call is to be placed, selectively applies these indicia, or related signal indicia, to a telephone line for transmission to a central office.

When dealing with conventional D-C signals such as those generated by the well known rotary type telephone dial, the pulses so generated are typically stored directly in the register or recording medium, which may be a magnetic drum or magnetic tape, for example. In the CALL mode or operation, means are known for extracting the recorded signals, amplifying these signals and applying them directly to a telephone line. One example of a repertory dialer of this type is disclosed in Patent 2,953,647, issued to A. E. Johnson, Sept. 20, 1960.

With the advent of electric central office switching systems that are adapted to receive multifrequency dial signals, a need has been created for a repertory dialer that stores and transmits multifrequency dial signals. In the prior art some attempts have been made to develop repertory dialers wherein the conventional pushbutton dial-generated, two-tone signals are recorded directly in the storage media. In such dialers these recorded tones are sensed on command and applied directly to the telephone line. One example of such an arrangement is disclosed in Patent 3,128,351 issued on Apr. 7, 1964 to L. A. Hohmann, Jr., F. W. Kinsman and T. P. Nenninger.

In a repertory dialer such as that disclosed by Hohmann et al., wherein dial generated multifrequency signals are recorded and wherein these same signals are extracted and applied to the telephone line, consistent accuracy in extracting and transmitting the precise signal as dialed and recorded tends to fall below the rigorous reliability standard of telephone practice. Even though high precision components are utilized in combination with sophisticated frequency correcting arrangements and equipment for synchronizing recording speed with the read out speed, a certain amount of distortion still occurs, distortion that can result, under certain conditions, in the transmission of spurious signals. Additionally, even though the refinements indicated could conceivably reduce distortion to an acceptable level, the additional expense involved would unduly reduce the commercial attractiveness of the dialer.

One approach to solving the distortion problem inherent in the recording and subsequent reading out of multifrequency signals is disclosed by R. A. Miller and C. M. Taris in Patent 3,243,517, issued Mar. 29, 1966. Miller and Taris employ a pushbutton dial and in one mode of operation conventional, dial-generated, two-tone signals may be applied directly to the telephone line without storage. When storage of a directory number is desired, however, the operation of the pushbutton dial results in the generation of a group of D-C signals which correspond, in terms of a binary type code, to the digit dialed. A four-track recording head is employed to apply the D-C signal or signals to a magnetic drum and it is the presence or absence of a signal on each of the four parallel tracks that preserves the identity of the dialed digit. On read out the four-track head simultaneously senses the presence or absence of the recorded D-C signal indicia on each successive group of four-track parallel recordings. This information is then converted into the conventional two-out-of-seven multifrequency signal code and is utilized to initiate the generation of conventional dual-tone, multifrequency signals for application to the telephone line.

Although the Miller-Taris approach avoids the distortion that is inherent in the direct recording and reading out of multifrequency signals, the multitrack concept introduces other disadvantages in terms of both cost and complexity. Consequently, there is no known system in the prior art that fully meets the need for a commercially attractive and operationally reliable multifrequency signaling repertory dialer.

Accordingly, one subject of the invention is to improve repertory dialers of the multifrequency signaling type.

Another object is to reduce the complexity of repertory dialers of the type employing multifrequency signaling.

A further object is to reduce the cost of such dialers.

Another object is to enhance the reliability of such dialers.

These and other objects are achieved in accordance with the principles of the invention in a telephone repertory dialer that records each digit of a directory number in terms of a modified binary code that is expressed in the form of D-C pulses fed sequentially to a recording medium, the presence or absence of a pulse in each of the time slots in a digit block on the medium being indicative of the digit dialed. In the read-out mode each time slot in a digit block is sensed sequentially for the presence or absence of a pulse and the information so extracted is uniquely translated into a pair of pulses in the conventional two-out-of-seven multifrequency signal code, which pulses are, in turn, utilized to initiate multifrequency pulse generation by a multifrequency signal oscillator.

One aspect of the invention concerns the specific means employed to effect code translations both in the RECORD and CALL modes of operation. Specifically, in the RECORD mode a printed circuit commutator is uniquely employed to effect translation from the parallel output of a two-out-of-seven to binary converter to a serial or sequential output for recording. A synchronizing relay controlled by suitable logic circuitry ensures proper synchronization between the storage medium drive motor and the commutator. Interdigital timing is controlled automatically by the commutator. In the CALL mode a commutator is employed to effect a sequential to parallel shift in the signals extracted from the recording medium. Each combination of parallel signals so derived is then translated into the two-out-of-seven code by conventional means and is employed as indicated above.

As a result of the sequential form employed for the recording of the pulses representing each digit, a recording medium in the form of an exceptionally narrow magnetic tape may advantageously be employed. Inasmuch as there is no recording of multifrequency signals, all of the problems inherent in such recording are obviously avoided. Moreover, the disadvantages of cost and complexity that relate to a four-track head are also avoided in that a single track head may be employed with sequential recording.

Accordingly, one feature of the invention pertains to an arrangement for effecting a two-out-seven to binary code conversion and for recording, in a telephone repertory dialer, by means of a single track transducer, the results of this conversion in terms of a sequential grouping of time slots each having a pulse or "no pulse" in conformance with a type of binary code.

Another feature of the invention relates to the combination, in a telephone repertory dialer, of a conventional two-out-of-seven code multifrequency tone generator and a means for generating a binary encoded sequential D-C signal combination, either or both being responsive, selectively, to the operation of a pushbutton dialing mechanism.

A further feature involves the combination, in a telephone repertory dialer of a conventional two-out-of-seven code multifrequency tone generator and a means for generating a binary encoded sequential D-C signal combination, either or both being responsive, selectively, to the operation of a pushbutton dialing mechanism, the tone generator also being selectively responsive to the extraction of the D-C signal combination from a storage medium.

An additional feature concerns an arrangement in a telephont repertory dialer for exercising common control over a commutator and a tape drive mechanism, the commutator being employed to translate a parallel-fed pulse group arranged in a type of binary code into a sequential pulse group, the latter group being recorded sequentially and longitudinally on the tape.

Still another feature involves the utilization of a commutator arrangement including logic circuitry as a portion thereof for controlling the automatic introduction of uniform interdigital timing during the process of recording signal indicia in a repertory dialer.

A further feature relates to a means under the control of a commutator for stopping the travel of the recording medium during interdigital timing, thus ensuring the conservation of recording medium space and the establishment of a relatively brief scanning time.

These and other features and objects will be fully apprehended from the following detailed description of an illustrative embodiment of the invention and from the appended drawing in which.

Figures 1A, 1B:
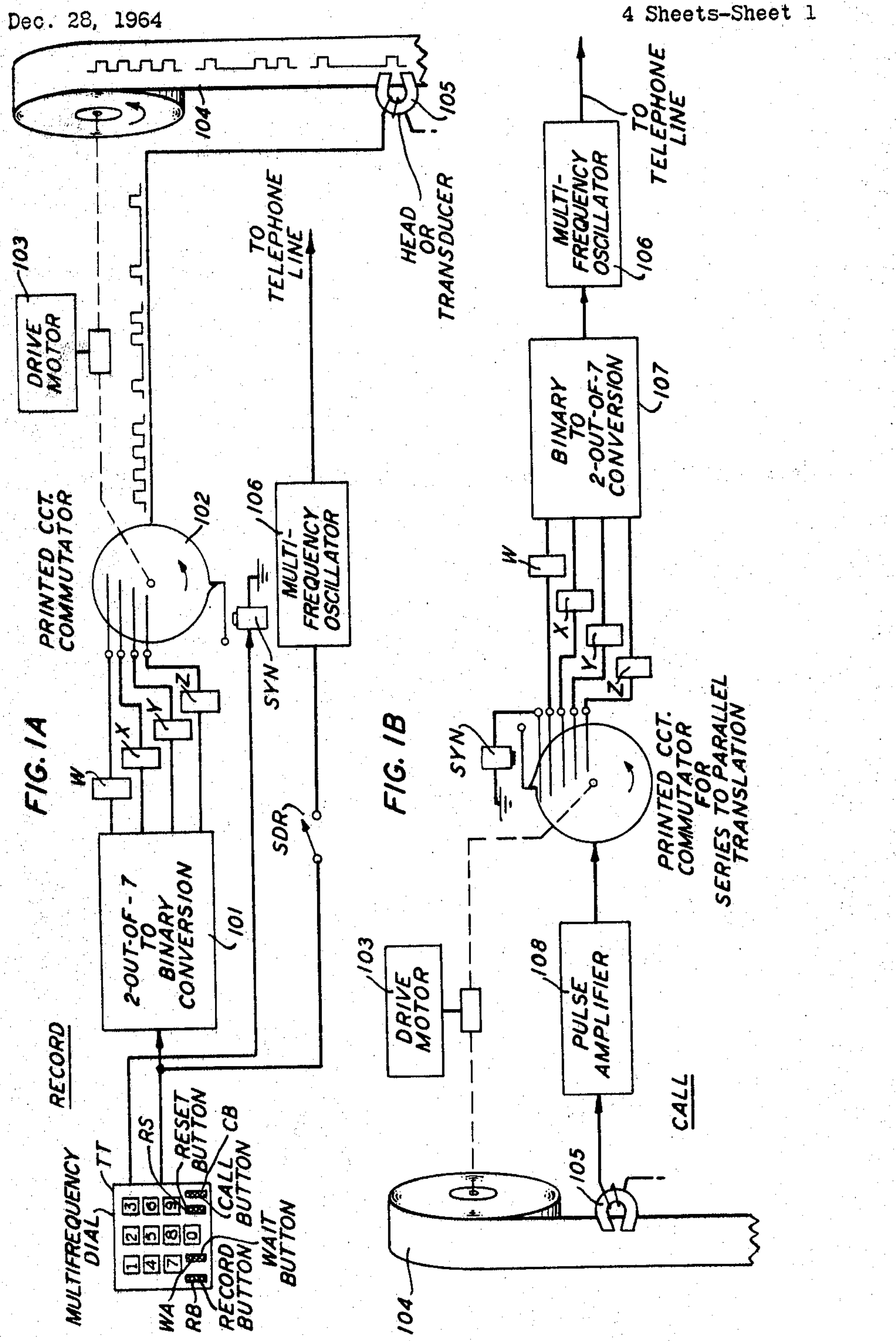
FIG. 1A is a block diagram of a repertory dialer in accordance with the invention illustrating the RECORD mode of operation.
FIG. 1B is a block diagram of a repertory dialer in accordance with the invention illustrating the CALL or automatic dialing mode of operation.

The repertory dialer of FIGS. 1A and 1B which embodies the principles of the invention, comprises a substantially conventional multifrequency signal generating pushbutton dial TT of a type now in widespread commercial use. Operating buttons on the dial TT include ten digit buttons, a RECORD button RB, a WAIT button WA, a RESET button RS, and a CALL button CB. The general function of each of these buttons is well known and is described in detail in the Miller-Taris Patent 2,243,517 cited above. In the RECORD mode of operation, the operation of RECORD button RB and one of the digit pushbuttons of the dial TT automatically encodes the digit dialed in the conventional two-out-of-seven multifrequency code. This output is converted into a form of binary language by converter 101, which conversion is expressed in the operation of a unique combination of the relays W, X, Y, and Z. A commutator 12 is employed in accordance with the principles of the invention to translate the operation of the coding relays W, X, Y, and Z, which are connected in parallel, and a preliminary synchronizing pulse into a train of pulses in serial fashion, each such pulse train being a combination of a synchronizing pulse and four pulse positions, a pulse position being a designation of either a pulse or the absence of a pulse, and each unique pattern of four pulse positions being indicative of a particular dialed digit.

Commutator 102 is also employed in accordance with the principles of the invention to provide certain of the logic controls for applying drive from drive motor 103 to move tap 104 in relation to head 105 so that each pulse train corresponding to a dialed digit is recorded longitudinally along tape 104, in the manner shown. Provision is made for simultaneous dialing out and recording by means of a selector switch SDR which, when closed, places the oscillator 106 under the control of the dial TT in the conventional relation.

To achieve automatic dialing out, commonly termed the CALL mode of operation, CALL button CB is operated and drive motor 103 once again moves tape 104 in relation to head 105. Pulses extracted by head 105 are amplified by pulse amplifier 108. The serial pulses so extracted are, in effect, translated into simultaneous or parallel indications in terms of the operation of one or more of the parallel connected relays W, X, Y, and Z. The binary type of encoding which is represented by the particular state of operation of the coding relays W, X, Y, and Z, is converted into the two-out-of-seven code by converter 107. The resulting two-out-of seven output indication is applied to the oscillator 106 so that multifrequency pulses may be applied to the telephone line. The means for converting from the two-out-of-seven to the binary type of code and from a binary type of code to a two-out-of-seven code, shown in block form only in FIGS. 1A and 1B, are well known and are disclosed in detail by Miller and Taris in the patent cited above.

Figure 2:
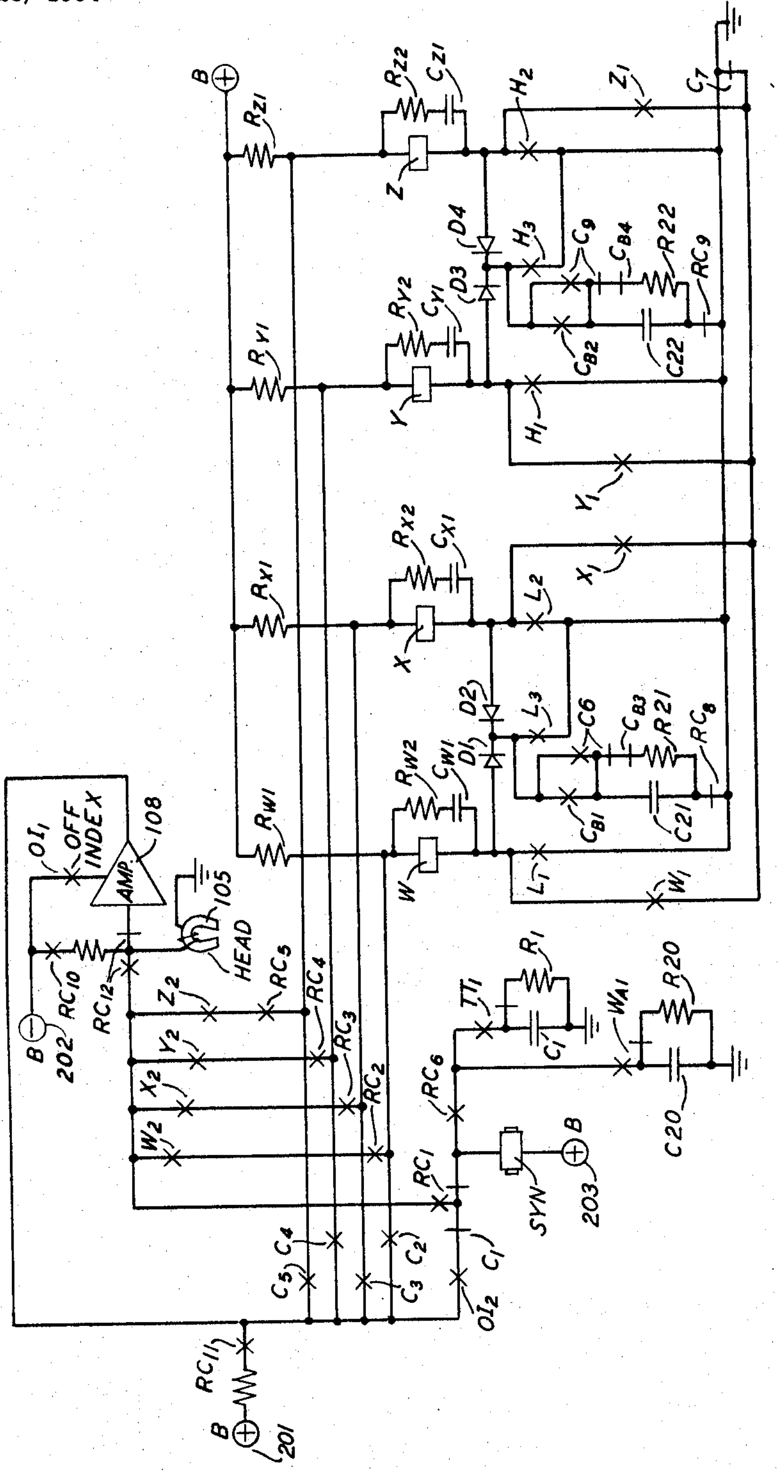
FIG. 2 is a schematic circuit diagram of a portion of the logic control circuity and code conversion circuitry of the dialer shown in FIG. 1.

Specific logic and control circuitry, indicated only broadly in FIG. 1, is shown in detail in the schematic circuit diagram of FIG. 2. With reference to the RECORD mode of operation, when RECORD button RB, shown in FIG. 1A, is operated, tape 104 is moved off its normal or index position. This action may be achieved in a number of ways, one of which is illustrated by the tape drive mechanism shown in schematic form in FIG. 3. The position of lever A controls band clutch BC and the position of band clutch BC, in turn, determines whether the driving power of motor 103 is transmitted to tape drive shaft 401 by way of gears G1 and G2. Linkage members A1, A2, and A3 are mechanically interconnected with lever A.

Figure 2A:
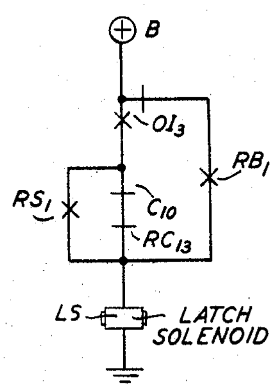
FIGS. 2A, 2B, 2C and 2D are schematic circuit diagrams of portions of the logic control circuitry of the repertory dialer shown in block form in FIG. 1.

The position of latch solenoid LS, synchronizing relay SYN, commutator 102 and cam CA thus all have an effect on the positioning of lever A and hence exercise control over the the tape drive. Initially, contact $RB_1$, FIG. 2A, completes an operating path for solenoid LS which holds linkage A2 and hence lever A in a position allowing tape 104 to move until tape 104 is at an off-normal position. At that point, linkage A3 is allowed to fall onto the relatively small radius portion of commutator 102 which, in turn, affects the position of lever A and stops the tape drive.

*Record mode*

Figure 2B:
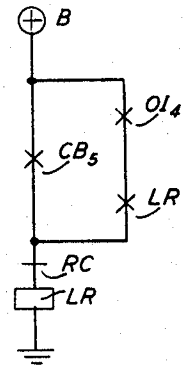
Figure 2C:
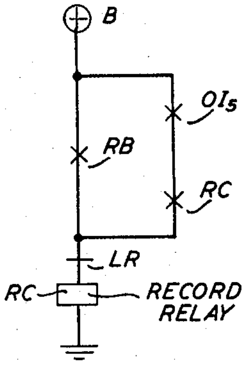
Figure 3:
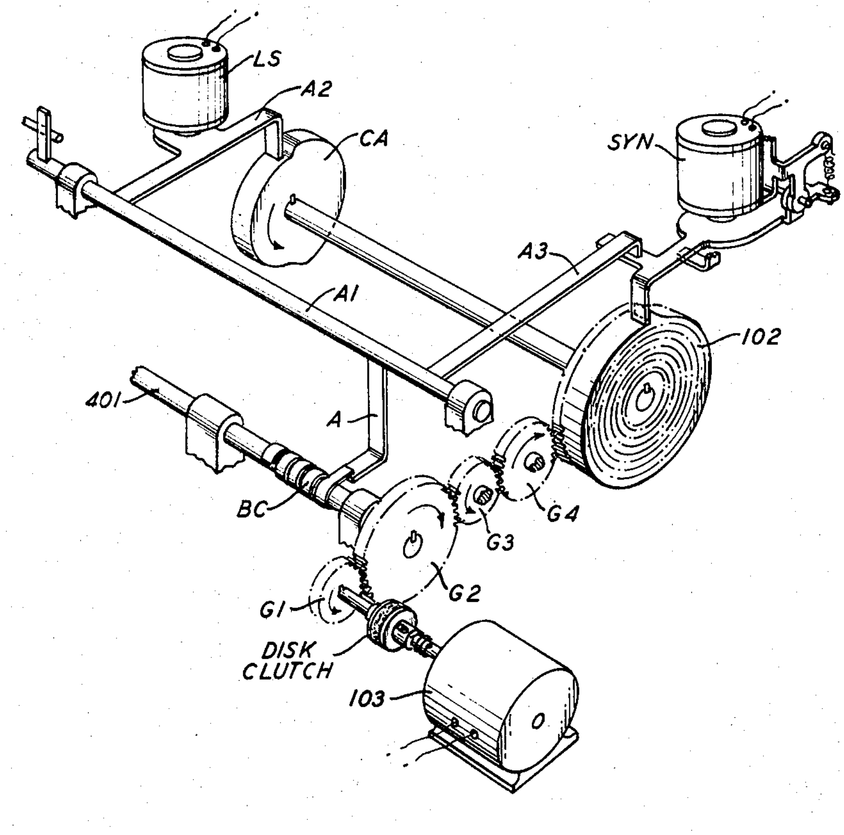
FIG. 3 is a mechanical schematic diagram of certain portions of the tape drive mechanism and commutator indicated in block form in FIGS. 1A and 1B.
Figure 3A:
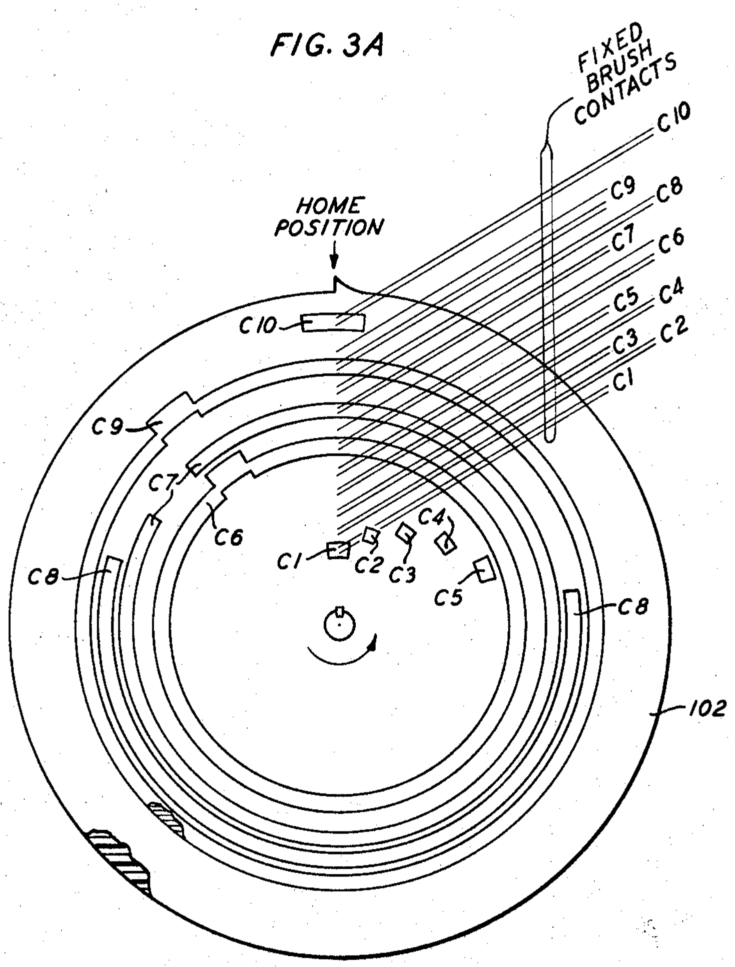
FIG. 3A is an enlarged view of the commutator face shown in FIG. 3.

The operation of RECORD button RB operates a RECORD relay RC, FIG. 2C, which relay operates contacts $RC_1$ through $RC_{12}$, shown in FIG. 2. The operation of transfer contacts $RC_1$ through $RC_5$ places contacts $C_1$ through $C_5$ of commutator 102 in series with code conversion relay contacts $W_2$, $X_2$, $Y_2$ and $Z_2$, respectively, which contacts, when operated, serve to complete paths for applying pulses to the recording media, tape 104, by way of make contact $RC_{12}$. Contacts $C_1$ through $C_{10}$ are operated through the cooperative relation of conventional brush contacts and conductive and nonconductive segments on the surface of commutator 102, as shown in FIG. 3A.

Break contact $RC_{12}$ removes the amplifier input from the circuit. Make contacts $RC_{10}$ and $RC_{11}$ connect ERASE-BIAS source 202 and RECORD-BIAS source 201 for head 105 into the circuit. Make contact $RC_6$ puts the operation of synchronizing relay SYN under the control of any digit button of the dial TT, FIG. 1. This control is achieved by the momentary operation of the synchronizing relay SYN, utilizing the discharge of capacitor C1 through make contact $TT_1$. Transfer contacts $TT_1$ are operated by the operation of any digit pushbutton.

Break contact $C_7$ controls the release of the encoding relays W, X, Y, and Z after recording of the pulse combination corresponding to the distinctive combination of operating conditions of these relays that represents the encoding of each dialed digit. Break contacts $RC_8$ and $RC_9$ disable the CALL button contacts $CB_1$, $CB_2$, $CB_3$ and commutator contacts C6 and C9 of commutator 102, which contacts are utilized in the CALL mode.

With the equipment moved off-normal in the manner described above, make contact $OI_2$, FIG. 2, is closed, which may be effected by an off-index cam in conventional fashion, and a recording current flows through make contacts $C_1$, $OI_2$, $RC_{11}$, and $RC_{12}$ to head 105. Drive motor 103, which may be additionally controlled by conventional repertory dialer logic circuitry, as shown for example by Miller and Taris in the patent cited above, is running at this time. When any digit button on dial TT is depressed, which is the action required to "dial a number," the following steps occur: (1) those relays of the relay group W, X, Y, and Z required to encode the dialed digit are operated via the proper operated combination of the conventional frequency selecting contacts of dial TT and are held operated by one or more of their own contacts, namely, $W_1$, $X_1$, $Y_1$ and $Z_1$, respectively, and in series with make contacts $RC_7$ and $C_7$; (2) synchronizing relay SYN is pulsed by the operation of transfer contacts $TT_1$, which moves lever A, shown in FIG. 3, to permit tape 104 to move and to release commutator 102; (3) pulses are recorded in the pulse positions on the tape according to the condition of the W, X, Y, and Z relays; (4) after make contact $C_5$ has closed, and then opened, two operations occur—(a) the tape motion is stopped by cam CA moving lever A into contact with band clutch BC, and (b) the release of the operated relays W, X, Y, and Z by the opening of break contact $C_7$. The above steps are repeated until the pulse encoding of the entire dialed directory number has been recorded.

In the process of recording a single digit, the tape mechanism does not run continuously. As broadly indicated above, and as shown in FIG. 3, tape drive is controlled by the action of lever A. In further detail, when lever A, or more specifically, linkage member A3, is at the small radius of commutator 102 and the band clutch BC is in contact with lever A, the tape mechanism is stopped. Linkage member A3 can be moved from the small radius of cam CA, however, by the operation of the synchronizing solenoid SYN, which occurs at the time any digit button of the dial TT is depressed or when cam CA is moved off its home position which normally occurs during the recording or dialing out of a digit, or when latch solenoid LS operates, which occurs whenever contact C10 closes in the CALL mode and also when RECORD button RB is operated to start the RECORD mode.

As previously indicated, when lever A (connecting linkage A3) is allowed to move to the small radius of commutator 102, the tape stops. To reset, a normally open contact $RS_1$, shown in FIG. 2A, operated by RESET button RS, shown in FIG. 1, completes an operating path for latch solenoid LS, shown in FIG. 2A. The operation of latch solenoid LS (FIG. 3) moves lever A2, in turn moving lever A1, A, and clutch BC to permit the tape mechanism to move to the end of its travel and reset. The RECORD relay RC is then released when the off-index contacts indicate that the home position has been reached.

*CALL mode*

Figure 2D:
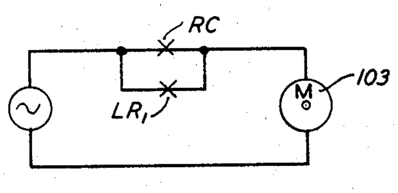

In the CALL mode of operation CALL button CB operates make contact $CB_5$, FIG. 2B, completing an operating path for relay LR. Motor 103 operates over a path completed by make contact LR, FIG. 2D. At that point, break contact C10 of commutator 102 releases and hence the subsequent operation of the off-index switch completes an operating path for latch solenoid LS by way of make contact $OI_3$. The operation of latch solenoid LS moves connecting linkages A2 and A1 to cause lever A to engage band clutch BC which permits the tape drive mechanism to operate.

When a recorded pulse is extracted from tape 104 by head 105, it is amplified by amplifier 108, passes through make contacts $OI_2$ and $C_1$ to solenoid SYN. The operation of solenoid SYN permits synchronous operation of the tape drive mechanism and the rotation of commutator 102 as shown in FIG. 3. Additional contacts $CB_1$ and $CB_3$ complete operating paths for relays W and X and contacts $CB_2$ and $CB_4$ complete operating paths for relays Y and Z. Each of the relays W, X, Y, and Z is held operated by way of one of its own contacts and by break contact $C_7$.

When make contact $C_2$ of commutator 102 is closed, a pulse from amplifier 108 releases relay W but if no pulse is present, relay W remains operated. The same relative relation also exists with respect to contacts C3, C4, and C5, and relays X, Y, and Z. Thus, each pulse extracted from tape 104 is expressed in terms of the nonoperated condition of a corresponding W, X, Y, or Z relay. At this point, contact $C_8$ closes, which energizes the signal oscillator 106 to transmit the digit information for a known period of time, under control of the closure of contact C8. Such signal oscillators are well known in the art, being disclosed for example in Patent 3,128,351, issued to L. A. Hohmann, F. W. Kinsman and T. P. Nenninger Apr. 7, 1964. Minimum interdigital time is controlled by the rotation of commutator 102. This time is equivalent to the time from the opening of contact C7 to the reclosure of contact C8. Time in addition to this minimum time may result from the holding of commutator 102 by the SYN relay until a synch pulse is received from the tape.

When commutator contacts C8 and C7 open, the coding relays release and subsequently commutator contacts C6 and C9 operate to reoperate relays W, X, Y, and Z. Contact C10 closes to operate latch solenoid LS, shown in FIGS. 2 and 4, which permits the tape mechanism to move again. (As explained above, the mechanism was stopped when lever A—as extended by connecting linkage A3—moved to the small radius of commutator 102). Contact C1 closes, waiting for the synchronizing pulse. The action described is repeated for the reading out and transmission of each recorded digit.

In FIG. 1, a WAIT button WA is shown although details of its place in the logic circuitry have been neither shown nor described. A WAIT button is typically employed in a repertory dialer to permit the recording and dialing out of numbers where the actual connection involves the receipt of more than one dial tone. A WAIT button may be connected in a number of circuit configurations to perform the necessary logic functions. For example, a timer may be employed after the closing of make contact $C_{10}$ to stop tape 104 prior to arrival of the synchronizing pulse. A reoperation of the CALL button CB would then be necessary to restart the scan for additional pulses. Alternatively, the automatic detection of dial tone from the central office can be employed to initiate the proper logic sequence.

It is to be understood that the embodiment described herein is merely illustrative of the principles of the invention. Various modifications may be made thereto by persons skilled in the art without departing from the spirit or scope of the invention.

What is claimed is:

1. In a telephone repertory dialer, in combination, means for generating signal indicia corresponding to a directory number, means for translating said signal indicia into binary coded signals, a recording medium having a longitudinal and a transverse dimension, means including only a single recording head for sequentially recording all of the binary elements of each one of said last named signals longitudinally on said recording medium, and means for translating said last named signals into multifrequency pulses for transmission on a telephone line.

2. In a telephone repertory dialer, in combination, means for generating first signal indicia of a digit of a directory number in terms of a two-out-of-seven code, means for translating said first indicia into second indicia in terms of a binary type code, a magnetic recording medium, means for recording each of said second indicia sequentially on said recording medium, the recording of all of the second indicia of all recorded directory numbers being along a common line in said recording medium, means for extracting said second indicia from said recording medium, means for translating extracted ones of said second indicia into third indicia in terms of a two-out-of-seven code, and means responsive to said third indicia for generating multifrequency signals and applying said last named signals to a telephone line.

3. In a telephone repertory dialer, in combination, means for generating first signal indicia of a digit of a directory number in terms of a two-out-of-seven code, means for translating said first indicia into second indicia presented in simultaneous parallel relationship to each other in terms of a type of binary code, first means for translating said second parallel indicia into sequential relation, magnetic recording mans including a tape and only one single track transducer, means for effecting relative movement between said tape and said transducer longitudinally only with with respect to said tape, means including said transducer and said movement effecting means for applying said second indicia sequentially to said tape, means for sequentially extracting said sequentially recorded second indicia from said tape, means for translating sequentially extracted ones of said second indicia into signals in parallel relation, second means for translating said last named signals from a binary type code into signals in a two-out-of-seven code form, and means responsive to said last named signals for generating corresponding multifrequency signals and applying said last named signals to a telephone line.

4. Apparatus in accordance with claim 3 wherein said first means includes a first commutator.

5. Apparatus in accordance with claim 4 including means for synchronizing the action of said commutator with the relative movement of said tape and said transducer.

6. Apparatus in accordance with claim 3 wherein said second means includes a second commutator.

7. Apparatus in accordance with claim 6 including means for synchronizing the action of said second commutator with the relative movement of said tape and said transducer.

8. In a telephone repertory dialer, in combination, pushbutton dialing means, means responsive to the operation of a digit indicative pushbutton in said dialing means for generating a first group of signals in simultaneous parallel relation indicative of said digit in terms of a type of binary code, means for translating said first group of signals into a second group of signals in sequential form, means including a recording medium and only a single, single-track transducer in cooperative relation therewith for recording said second group of signals thereon in sequential fashion, means including said transducer for sequentially extracting recorded ones of said signals in said second group, means for translating extracted ones of said signals within each group from serial to parallel form, means for translating said signals in said sequential form into a group of signals in parallel form, and means responsive to said last named signals for generating corresponding multifrequency signals and applying said multifrequency signals to a telephone line.

9. Apparatus in accordance with claim 8 including means selectively and directly responsive to said dialing means for generating multifrequency signals and for applying said last named signals to a telephone line.

10. Apparatus in accordance with claim 9 including means for rendering either said directly responsive means or said recording means responsive to the operation of said dialing means or, selectively, rendering both said directly responsive means and said recording means simultaneously responsive to said dialing means.

11. Apparatus in accordance with claim 8 wherein said recording medium comprises a selectively narrow magnetic tape, each of the signals recorded on said tape being longitudinally displaced along said tape from all others of said recorded signals and each of said last named signals being recorded a like lateral distance from the edges of said tape.

12. In a telephone repertory dialer, in combination, means for generating signal indicia corresponding to a digit of a directory number, means for converting said indicia into a train of D-C signals indicative of said digit in terms of a type of binary code, a relatively narrow magnetic recording tape, means including a single track head for recording said train of D-C signals longitudinally on said tape, and means responsive to said last named signals for generating corresponding multifrequency signals for transmission on a telephone line.

No references cited.

KATHLEEN H. CLAFFY, *Primary Examiner.*

A. H. GESS, *Assistant Examiner.*